(12) United States Patent
Chapman

(10) Patent No.: US 6,580,718 B1
(45) Date of Patent: Jun. 17, 2003

(54) METHOD AND APPARATUS FOR PREVENTING UNAUTHORIZED USE OF A PERMANENT VIRTUAL CONNECTION

(75) Inventor: Donald Brent Chapman, Mountain View, CA (US)

(73) Assignee: Covad Communications Group, Inc., Santa Clara, CA (US)

( * ) Notice: Subject to any disclaimer, the term of this patent is extended or adjusted under 35 U.S.C. 154(b) by 0 days.

(21) Appl. No.: 09/199,235

(22) Filed: Nov. 24, 1998

(51) Int. Cl.[7] ............................................... H04L 12/28
(52) U.S. Cl. ........................................ 370/409; 709/227
(58) Field of Search .................................. 370/375, 377, 370/384, 409; 713/168, 169, 170, 183, 201, 202; 709/227

(56) References Cited

U.S. PATENT DOCUMENTS

| | | | | |
|---|---|---|---|---|
| 5,311,596 A | * | 5/1994 | Scott et al. ................... 380/33 |
| 5,732,137 A | * | 3/1998 | Aziz ............................ 380/25 |
| 5,867,571 A | * | 2/1999 | Borchering .................. 370/384 |
| 5,898,830 A | * | 4/1999 | Wesinger, Jr. et al. ...... 713/201 |
| 5,918,019 A | * | 6/1999 | Valencia ...................... 709/227 |
| 5,918,022 A | * | 6/1999 | Batz et al. ................... 709/236 |
| 6,028,867 A | * | 2/2000 | Rawson et al. ............. 370/463 |
| 6,055,239 A | * | 4/2000 | Kato ........................... 370/409 |
| 6,097,722 A | * | 8/2000 | Graham et al. ............. 370/395 |
| 6,125,119 A | * | 9/2000 | Cherukuri et al. .......... 370/410 |
| 6,222,845 B1 | * | 4/2001 | Shue et al. .................. 370/400 |
| 6,370,152 B1 | * | 4/2002 | Schofield et al. ........... 370/432 |

* cited by examiner

*Primary Examiner*—Melvin Marcelo
*Assistant Examiner*—Jasper Kwoh
(74) *Attorney, Agent, or Firm*—Jung-hua Kuo

(57) ABSTRACT

A connection manager which requires re-authentication of a user of a permanent virtual connection (PVC). Data transfer may be disabled upon the occurrence of a pre-specified condition, and is enabled only upon proper authentication. An out-of-band connection (e.g., another PVC) may be used for such authentication. The connection manager may disable data transfer by a controlling a customer premise equipment (CPE) serving the managed PVC.

17 Claims, 5 Drawing Sheets

METHOD AND APPARATUS FOR PREVENTING UNAUTHORIZED USE OF A PERMANENT VIRTUAL CONNECTION

RELATED APPLICATIONS

The present application is related to U.S. patent application Ser. No. 09/252,354, entitled "A System, Method, and Network for Providing High Speed Remote Access From Any location Connected by a Local Loop to a Central Office," filed Feb. 17, 1999, and issued Feb. 22, 2000 as U.S. Pat No. 6,028,867, which is a continuation of U.S. patent application Ser. No. 09/098,020, now abandoned, filed Jun. 15, 1998 (hereafter "RELATED APPLICATION 1"), the entirety of which is incorporate by reference herein.

BACKGROUND OF THE INVENTION

1. Field of the Invention

The present invention relates to networks, and more specifically to a method and apparatus for preventing unauthorized use of a permanent virtual connection provisioned on a network.

2. Related Art

Networks are often used to provide virtual connections between end systems. A typical network includes several network elements (e.g., switches, routers, DSL access multiplexors) to provide a virtual connection between two end systems (e.g., telephones, computer systems). A connection provides the necessary data transport to enable network applications (e.g., voice calls, remote access) between the two end systems. A connection is generally referred to as a virtual connection due to the absence of dedicated wires connecting the end systems.

In a typical situation, a user uses a user system (e.g., computer system implementing client software) to access a protected system (e.g., a computer system implementing server software). An accessed system is generally referred to as a protected system because it is often desirable to prevent unauthorized access to the accessed system. The user system and protected system are examples of end systems. In general, several user systems access a protected system and an organization (e.g., a corporation) may have several protected systems serving several different purposes and applications.

Some connections between user systems and protected systems may be provided as permanent virtual connections (PVCs). A permanent virtual connection generally refers to a virtual connection which not terminated when not in use. As an illustration, a non-permanent virtual connection may be terminated when a voice call using the connection is terminated. On the other hand, a permanent virtual connection may not be terminated even if a voice call using the connection is terminated.

Devices such as customer premise equipment (CPE) are often used in provisioning the PVCs (any virtual connections, in general) as is well known in the relevant arts. A typical PVC is provisioned between two dedicated CPEs. A user system generally sends and receives data to/from one CPE (conveniently termed as "user CPE" hereafter) and a protected system sends and receives data to/from another CPE. The CPEs in turn use a provisioned PVC for transferring the data between the user system and the protected system.

One problem with such PVCs is that there may be an enhanced risk of unauthorized access to protected systems. The risk is generally due to the feature of not terminating PVCs even when not in use. As an illustration, an authorized user may first logon to a protected system from a user system using a provisioned PVC and leave the session active. As the PVC is not terminated even if no data is transferred, an unauthorized user may later work with the protected system using the same user system and active session. Such unauthorized access may be undesirable.

Password type authentication mechanisms are often used on protected systems for protection against unauthorized use. Some protected systems may use periodic authentication, at least upon inactivity in a session. Such periodic authentication may prevent unauthorized access in some situations. However, not all protected systems may have such periodic authentication mechanisms. In addition, authentication mechanisms may not be robust on the protected systems. Accordingly, an administrator of the protected systems may be concerned about the risk of unauthorized use and access of the protected systems.

Therefore, what is needed is a method and apparatus for preventing unauthorized use and access of any protected systems accessible by a permanent virtual connection provisioned on a network.

SUMMARY OF THE INVENTION

The present invention may prevent unauthorized use of a permanent virtual circuit (PVC) ("managed PVC") by forcing a user to authenticate upon the occurrence of a pre-specified condition. A telecommunication system in accordance with the present invention may include a user system connected to a user CPE, and a protected system connected to a managed CPE. A network is provided between the two CPEs. A managed PVC may be provisioned on the network between the user CPE and the managed CPE.

In accordance with the present invention, a connection manager may determine whether any pre-specified condition has occurred. If the condition has occurred, the connection manager may block data transfer on the managed PVC by interfacing preferably with the managed CPE. Absence of data transfer for a pre-specified duration is an example of a condition.

The user may then be required to authenticate before allowing the data transfer on the managed PVC. An out-of-band connection may be used for such authentication. The out-of-band connection may be implemented by another PVC provided on the same network supporting the managed PVC.

Due to the authentication procedure, unauthorized use of the managed PVC may be prevented. In addition, as the out-of-band connection can also be provided on the network, the implementation of authentication procedure may be simplified.

In an embodiment, the connection manager includes an access control block and an authentication server. The access control block may control the data flow on the managed PVC by controlling the managed CPE. The access control block may be designed to operate with a pre-existing authentication server used by any other systems, thereby reducing the cost of implementing the present invention.

Thus, the present invention may prevent unauthorized use of a managed PVC by requiring a user to authenticate periodically.

The present invention prevents (or minimizes) unauthorized use of protected systems irrespective of the robustness of any authentication loopholes on protected systems as the user is required to authenticate for transferring data on the PVCs providing access to the protected systems.

The present invention provides a cost-effective mechanism for authentication by providing another PVC using the shared network.

The present invention enables pre-existing authentication servers to be used by separating the access control block from the authentication server.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Present Invention

The present invention may prevent unauthorized use of a permanent virtual connection (PVC) by requiring a user to authenticate several times. Re-authentication requirement can be triggered upon satisfaction of any pre-specified condition(s). For example, inactivity on a PVC may require authentication before the PVC can be reused for transferring data. Re-authentication may be required periodically (e.g., every one hour during non-business hours). The PVC will be generally referred to as "managed PVC" in the present application.

Authentication may be performed by an out-of-band connection. An out-of-band connection generally refers any connection other than the managed PVC. Once authenticated (or re-authenticated), data transfer is allowed on the managed PVC.

In general, requiring re-authentication may prevent an unauthorized user from using the permanent virtual circuit connection. The present invention can be implemented in several environments. A method in accordance with the present invention is described below first, and an example environment for implementing the present invention is described next.

2. Method

Figure 1:
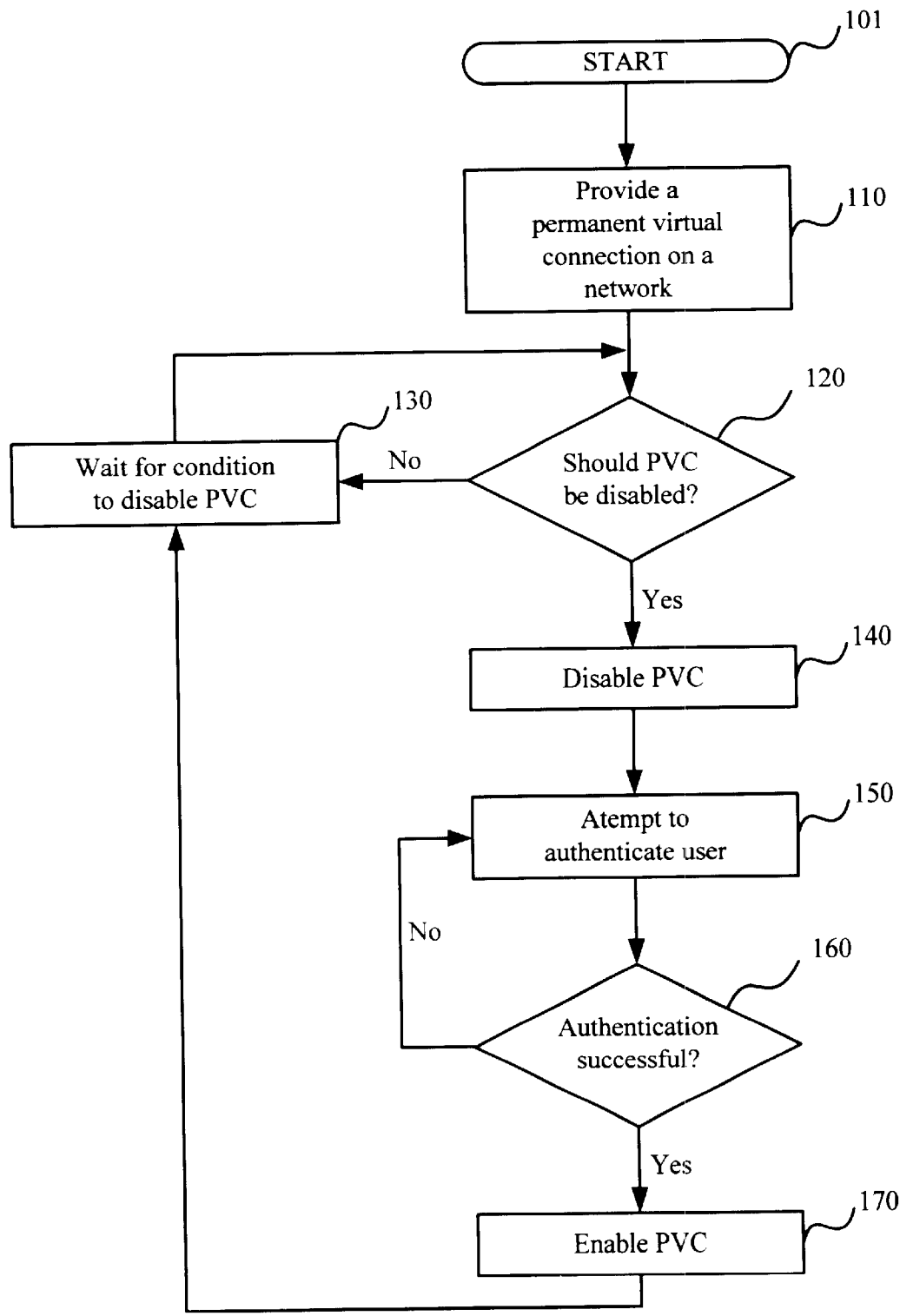
FIG. 1 is a flow-chart illustrating a method according to the present invention.

FIG. 1 is a flow-chart illustrating a method in accordance with the present invention. In step 110, a managed permanent virtual connection (PVC) is provided (provisioned) on a network. The managed PVC has pre-specified end points. In the embodiment(s) described herein, the managed PVC is provided between CPEs which interface with the network.

In step 120, a decision is made as to whether the managed PVC should be disabled. The decision is generally based on the occurrence of a pre-specified condition. The condition may be, for example, inactivity on the managed PVC for a pre-specified duration. Another example of a condition is, requesting re-authentication every one hour during non-business hours under the assumption that telecommuters are less likely to use the managed PVC in non-business hours. Several conditions may be specified and the decision to disable the managed PVC may be based on one or more of these conditions.

If the decision in step 120 is to disable to the managed PVC, control passes to step 140, in which the managed PVC is disabled. The managed PVC is disabled typically by blocking data transfer on the managed PVC. If the decision in step 120 is not to disable the managed PVC, control passes to step 130, in which the invention waits for the occurrence of a pre-specified condition. If the pre-specified condition occurs, control passes to step 120 where a decision will be made to disable the managed PVC. The managed PVC is disabled in step 140 as noted above.

Steps 150 and 160 operate to authenticate the user. Any of several known approaches may be used for authentication. In step 150, the user using the managed PVC is forced to authenticate. In step 160, a determination is made as to whether the authentication is successful.

If authentication is determined to be successful in step 160, control passes to step 170, in which the managed PVC is (re)enabled. Control then passes to step 130. If authentication is determined not be successful in step 160, control passes to step 150.

Thus, by providing a mechanism to re-authenticate, the present invention may ensure that a managed PVC is not used by an unauthorized user even after an authorized user authenticates herself.

The present invention can be implemented in several environments. An example environment is described below in detail.

3. Example Environment

Figure 2A:
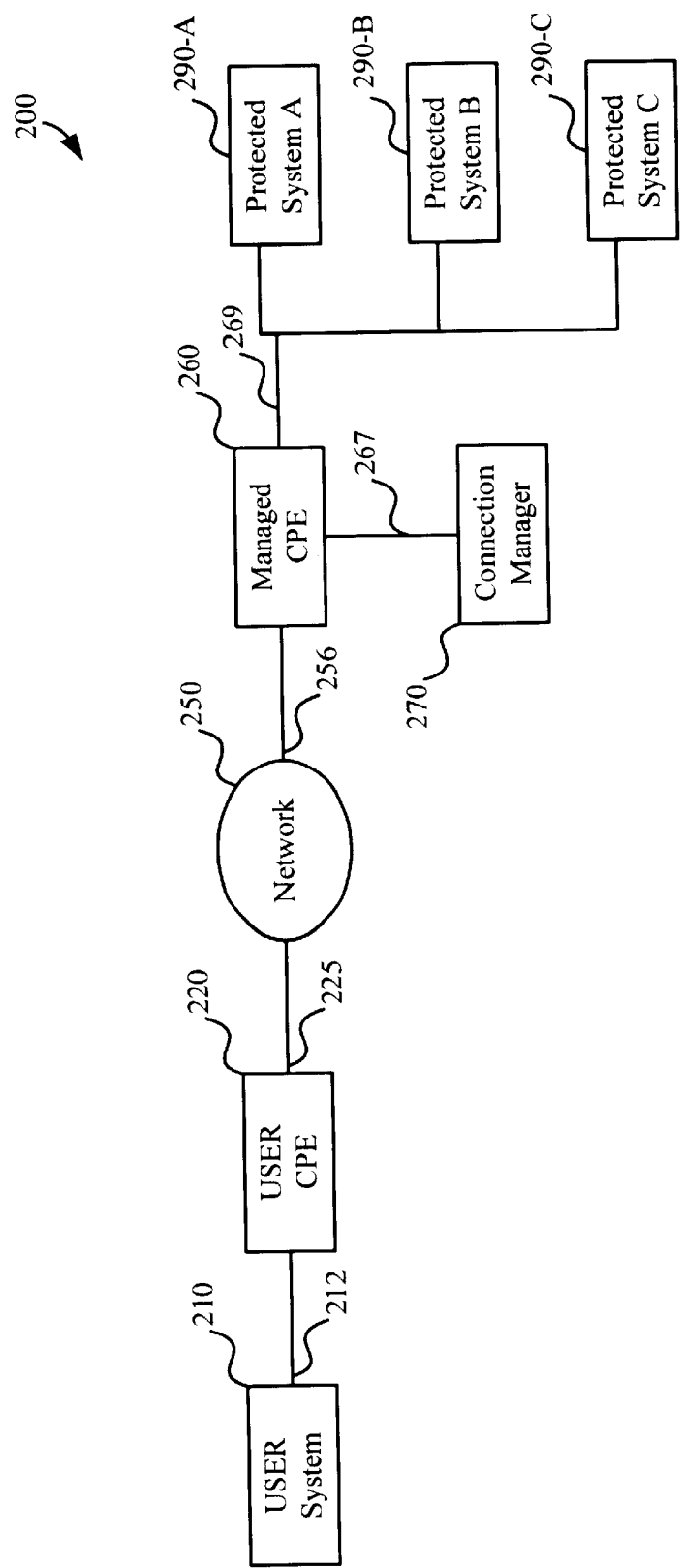
FIGS. 2A, 2B, and 2C are block diagrams illustrating different layers of connections enabling a user to access a protected system, and the manner in which the user may be forced to re-authenticate in accordance with the present invention.
Figure 2B:
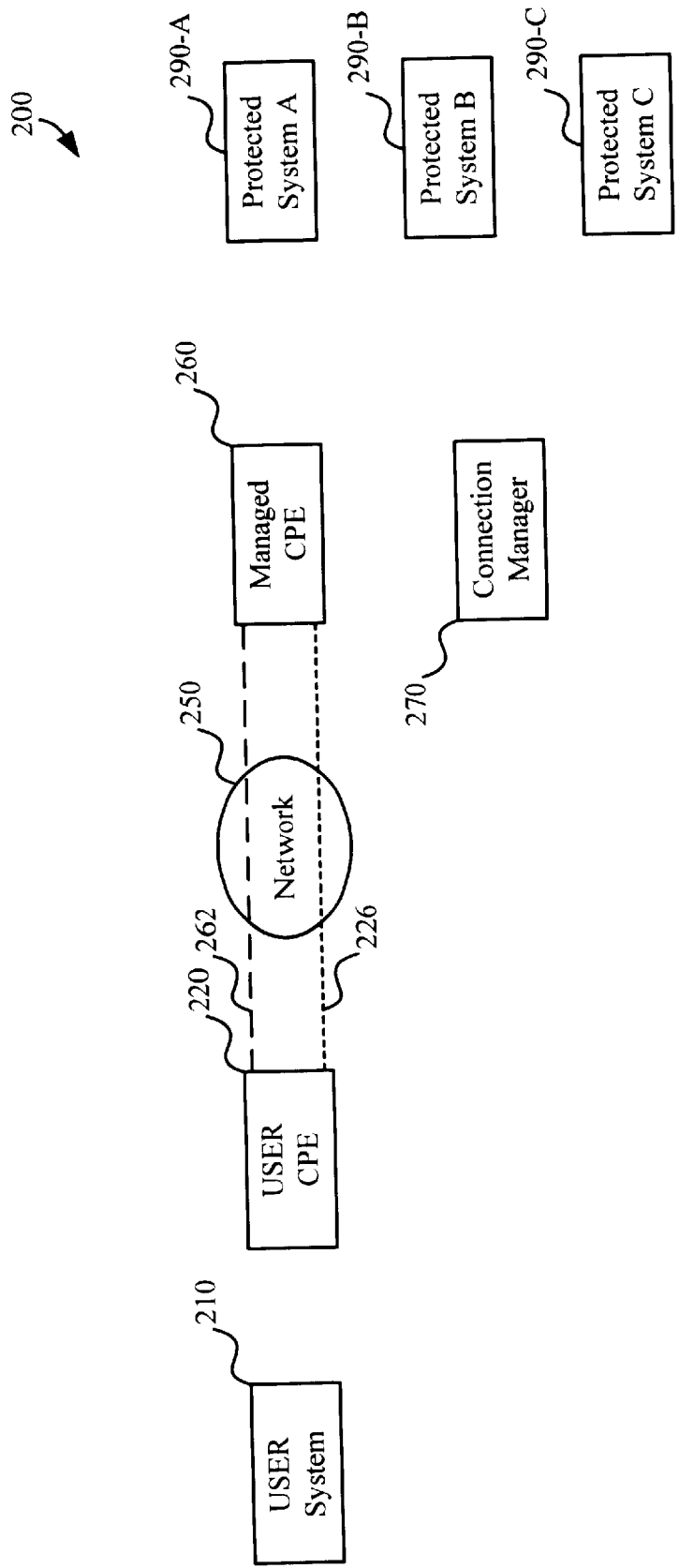
Figure 2C:
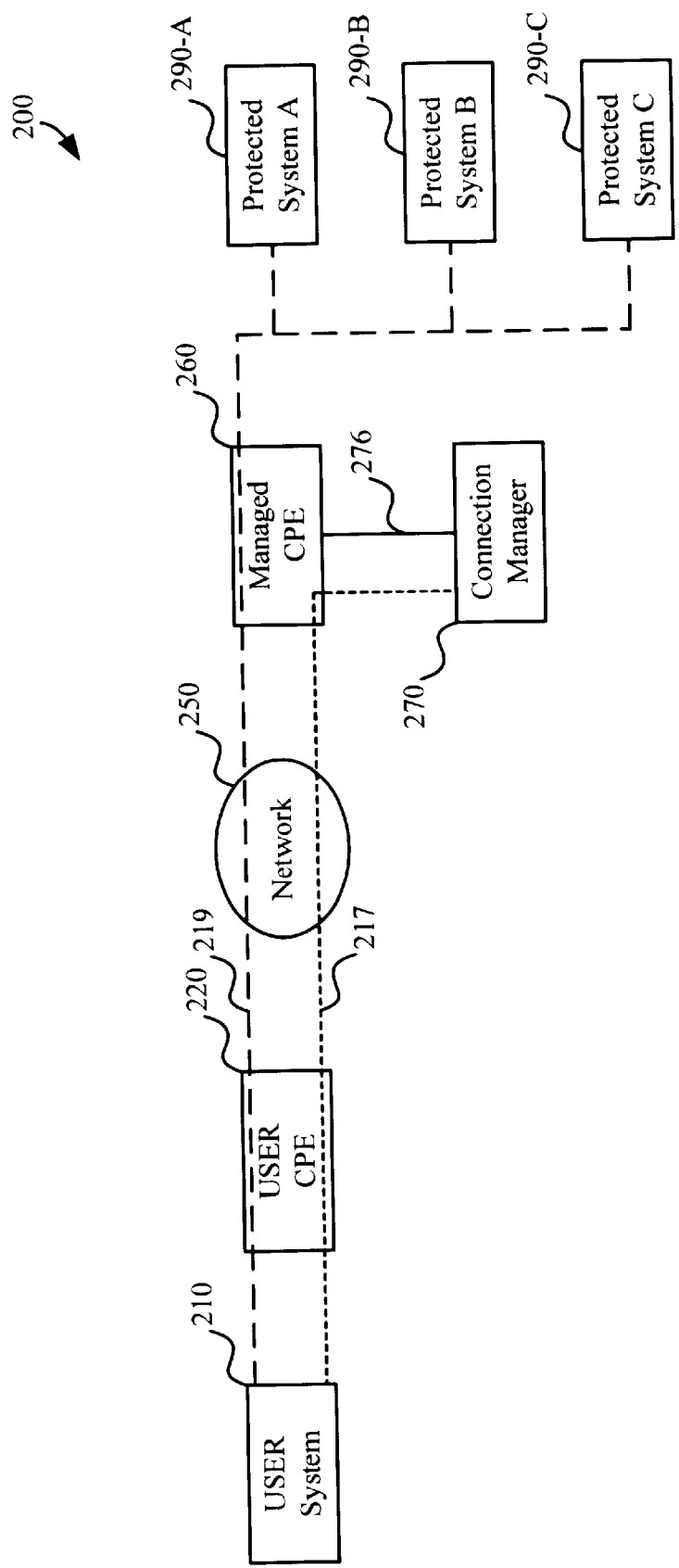

FIGS. 2A, 2B and 2C together illustrate an example telecommunication system 200 in which the present invention can be implemented. The three Figures include the same blocks to illustrate the different layers of connections. Telecommunication system 200 includes user system 210 accessing protected systems 290-A, 290-B and 290-C. User CPE 220, managed CPE 260, and network 250 provide the necessary data transport between user system and the protected systems. The protected systems will individually or collectively be referenced by numeral 290 as will be clear from the context.

FIGS. 2A, 2B and 2C together illustrate connections at different layers (levels). FIG. 2A includes lines 212, 225, 256, 267, and 269 representing physical connections. FIG. 2B includes managed PVC 262 and authentication PVC 226 provisioned on network 250. Managed PVC 262 enables applications between user system 210 and protected systems 290 to be supported. Authentication PVC 226 enables a user to be authenticated in accordance with the present invention. The two PVCs are provisioned using the physical connections depicted in FIG. 2A.

FIG. 2C depicts managed session 219, authentication session 217 and control session 276. Managed session 219 enables applications between user system 210 and protected systems 290. Authentication session 217 enables the user of managed PVC to be authenticated. Control session 276 enables connection manager 270 to communicate with and control the operation of managed CPE 260. Managed session 219 and authentication session 217 are supported by managed PVC 262 and authentication PVC 226 respectively. Control session 276 can be implemented using a direct interface such as RS-232 interface or on a shared network.

CPEs 220 and 260 may correspond to any devices which transfer data between the end systems using network 250. In an embodiment, CPEs 220 and 260 are implemented as internet protocol routers available from Cisco Systems, Inc., 170 West Tasman Drive, San Jose, Calif. 95134-1706. User system 210 may correspond to a personal computer and protected system 290 may correspond to a computer server. Alternatively, CPEs 220 and 260 may correspond to modems integrated into the corresponding computer systems. However, managed CPE 260 can be any network element, which can be controlled by an out-of-band connection in accordance with the present invention.

Network 250 may be configured with several virtual circuits. The configuration depends on the elements used within and elements interfacing with network 250, and such configuration will be apparent to one skilled in the relevant arts. Line 225 may correspond to a user loop and signaled using digital subscriber loop (DSL) technology. Several embodiments of network 250 operating with user loops are described in RELATED APPLICATION 1, which is incorporated in its entirety into the present application.

Connection manager 270 blocks data transfer on a connection upon the occurrence of a pre-specified condition. For example, data transfer may be blocked on the managed PVC when there is no data transfer for 10 minutes. To enable data transfer again, a user may need to be re-authenticated.

In accordance with the present invention, a user may need to use an out-of-band connection for authentication. The out-of-band connection can be provided in one of several ways. For example, a user may be initiate a telephone call (not illustrated in FIG. 2) for authentication.

In the embodiment(s) of FIGS. 2A, 2B, and 2C, a separate authentication PVC 226 is provisioned on network 250 for such authentication. The network elements (including CPEs 220 and 260, and network 250) may need to be configured to provision the connection. Authentication PVC corresponds to the out-of-band connection.

A user may use authentication session 217 for authentication. A suitable interface may be provided for authentication. For example, a user may be provided a convenient web-browser interface on user system 210 to provide the input data (e.g., user identification and password) for authentication. On the other hand, well-known interfaces such as Telnet can be used for authentication also. However, the authentication interface needs to be configured to use the out-of-band connection.

Once authenticated, connection manager 270 may allow for normal data transfer on the managed PVC. At least when conditions are based on data transfer activity on a managed PVC, connection manager 270 may need to communicate with managed CPE 260 to retrieve data transfer statistic for the managed PVC. Control session 276 may enable such communication.

Therefore, based on the data retrieved on control session 276, connection manager 270 may block and then enable data transfer on a managed PVC. Connection manager 270 needs to be generally designed to issue commands suited to the specific implementation of CPE 260 for retrieving information related to a managed PVC, and for the management of the managed PVC in general.

Figure 3:
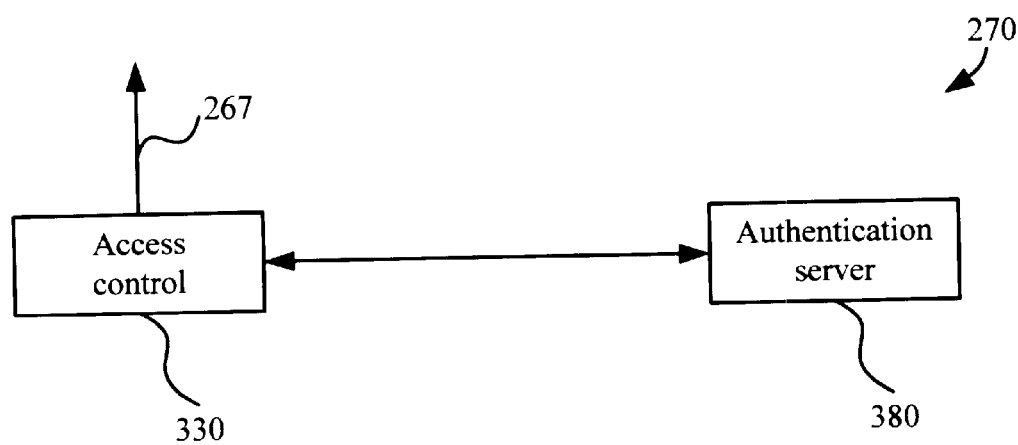
FIG. 3 is a block diagram of a connection manager in an embodiment of the present invention.

Thus, connection manager 270 may need to perform at least two tasks, (1) to control the data transfer on a managed PVC, and (2) authentication. A central site may wish to use a pre-existing authentication server, at least to centralize the authentication data management. FIG. 3 illustrates an approach which enables such a feature.

4. Connection Manager

FIG. 3 is a block diagram illustrating the details of an embodiment of connection manager 270. Connection manager 270 may include access control block 330 and authentication server 380. Access control 330 needs to be designed to issue specific commands on control session 276 to retrieve any required data and to manage a PVC.

Authentication server 380 can be implemented in a known way. For example, authentication may be performed using a challenge-response system. In one challenge-response system, authentication server 380 provides a number (challenge), which may be transferred to the user using an out-of-band connection (e.g., authentication session 217). A user is provided access to the challenge, and a user may need to input a response number. The response number may, in turn, be provided by a specialized device operating with an authentication protocol compatible with authentication server 380.

If the user response matches an expected response computed according to the authentication protocol, authentication server 380 provides an indication that the user is authenticated. Access control 330 may then enable data transfer, which may have been previously blocked upon the occurrence of any pre-specified condition. To enable the data transfer, access control 330 may issue pre-specified commands to managed CPE 260.

Thus, the present invention enables users to be authenticated several times even though a single PVC is used to serve the users.

5. Conclusion

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A telecommunication system preventing unauthorized use of permanent virtual connections (PVCs), said telecommunication system comprising:

a first system;

a second system;

a first customer premise equipment (CPE) coupled to said first system;

a network coupled to said first CPE, said network supporting a plurality of virtual connections including a managed PVC;

a second CPE coupled between said network and said second system, wherein said second CPE forwards data between said second system and said first system using said managed PVC; and a connection manager coupled to said second CPE, said connection manager for controlling said second CPE to block data transfer on said managed PVC upon the occurrence of a pre-specified condition, said connection manager providing for authentication of a user of said managed PVC, said authentication being performed using an out-of-band connection, said connection manager enabling data transfer on said managed PVC upon authentication of said user, said connection manager comprises an access control block for interfacing with said second CPE, wherein said access control block generates commands to said second CPE to block and allow said data transfer and an authentication server for authenticating said user, said authentication server being in communication with said access control block.

2. The telecommunication system of claim 1, wherein said out-of-band connection comprises a virtual circuit provided on said network between said first CPE and said connection manager.

3. The telecommunication system of claim 2, wherein said virtual circuit is provided as another PVC.

4. The telecommunication system of claim 1, wherein each of said first CPE and said second CPE comprises an internet protocol (IP) router.

5. The telecommunication system of claim 1, wherein said condition comprises inactivity on said managed PVC for a pre-specified duration.

6. A telecommunication system which enables connections to be authenticated several times, said telecommunication system comprising:

a first system;

a second system;

a network coupled to said second system, said network supporting a plurality of virtual connections including a first virtual connection for transferring data between said first system and said second system;

a first customer premise equipment (CPE) coupled between said network and said first system, wherein said first CPE forwards data between said first system and said second system using said first virtual connection; and a connection manager coupled to said first CPE, said connection manager for controlling said first CPE to block data transfer on said first virtual connection upon the occurrence of a pre-specified condition, said connection manager providing for authentication of a user of said first virtual connection, said authentication being performed using an out-of-band connection, said connection manager enabling data transfer on said first virtual connection upon authentication of said user, said connection manager comprises an access control block for interfacing with said first CPE, wherein said access control block generates commands to said first CPE to block and allow said data transfer and an authentication server for authenticating said user, said authentication server being in communication with said access control block.

7. The telecommunication system of claim 6, further comprising a second CPE coupled between said second system and said network.

8. The telecommunication system of claim 6, wherein said first virtual connection comprises a first permanent virtual connection (PVC) provisioned between said first CPE and said second CPE.

9. The telecommunication system of claim 6, wherein said out-of-band connection comprises a virtual circuit provided on said network.

10. The telecommunication system of claim 9, wherein said virtual circuit is provided as another PVC.

11. The telecommunication system of claim 7, wherein each of said second CPE and said first CPE comprises an Internet protocol (IP) router.

12. The telecommunication system of claim 6, wherein said condition comprises inactivity on said PVC for a pre-specified duration.

13. A method of providing a connection from a first system and a second system in a telecommunication system, said method comprising the steps of:

(a) providing a network supporting a plurality of virtual connections;

(b) provisioning a managed permanent virtual circuit (PVC) for transferring data between said first system and said second system, the telecommunication system further comprises a managed customer premise equipment (CPE) between said second system and said network;

(c) enabling data transfer on said managed PVC;

(d) blocking data transfer on said managed PVC upon the occurrence of a pre-specified condition, said blocking comprises issuing commands to said managed CPE to block data transfer on said managed PVC;

(e) enabling a user to authenticate using an out-of-band connection; and (f) reenabling data transfer on said managed PVC.

14. The method of claim 13, further comprising the step of provisioning another virtual circuit on said network, wherein said another virtual circuit comprises said out-of-band connection.

15. The method of claim 14, wherein said another virtual circuit comprises another PVC.

16. The method of claim 13, wherein step (d) comprises the step of determining whether no data transfer exists on said managed PVC for a pre-specified duration.

17. The method of claim 13, wherein said CPE comprises a router.

* * * * *